Patented Sept. 27, 1932

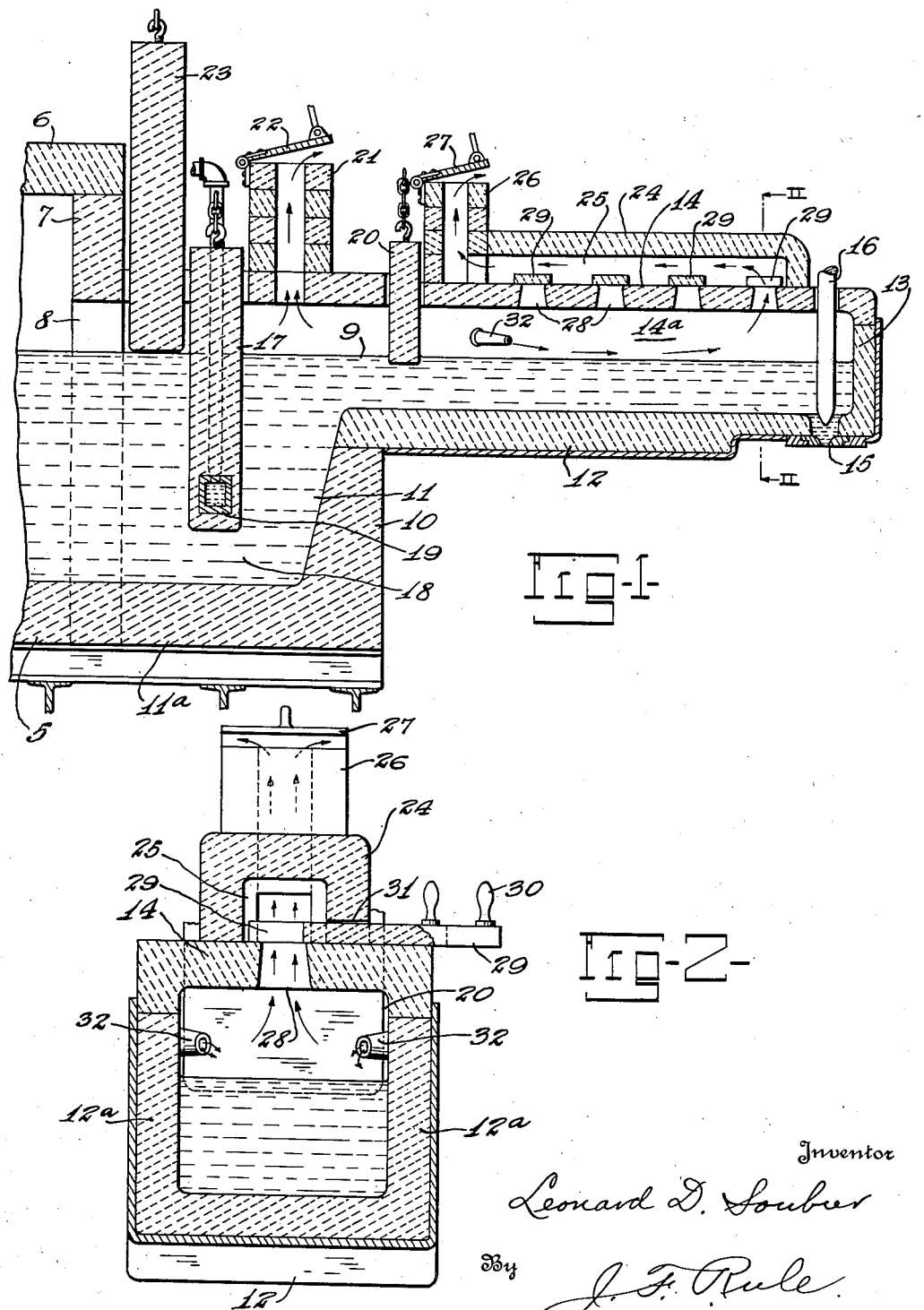

1,879,718

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FURNACE

Application filed April 17, 1929. Serial No. 355,947.

My invention relates to glass furnaces and particularly to means for regulating and controlling the temperature of the molten glass.

The invention is herein illustrated as embodied in a furnace comprising a melting tank having a forehearth or extension provided with an outlet opening thru which the molten glass is delivered to molds. In the process of melting the batch or raw materials, the glass is brought to a considerably higher temperature than that permitted when the glass is introduced into the molds. It is, therefore, necessary to lower the temperature of the glass considerably during its passage from the melting tank to the feeder outlet. The proper working temperature of the glass at the outlet also varies considerably, depending upon the size and kind of ware being produced, and other variable factors.

An object of the present invention is to provide efficient means for cooling the glass to any desired extent during its passage to the feeder outlet and for regulating the application of a heating or cooling medium to the glass at different points.

Other objects of the invention will appear hereinafter.

In the accompanying drawing:

Fig. 1 is a sectional elevation showing a melting furnace and a forehearth extension constructed in accordance with the principles of my invention.

Fig. 2 is a sectional elevation at the plane of the line II—II of Fig. 1.

The melting furnace 5 is provided with a roof 6 and a front wall 7 in which is an opening 8 for the passage of the molten glass 9 from the main furnace into an extension 10. This extension forms an accumulating chamber 11 into which the glass passes from the melting chamber. The floor 11ª of the extension is on the same level with the floor of the main tank, but said extension may be narrower than the tank.

Projecting forward from the extension 10 is a forehearth or boot comprising a floor 12, side walls 12ª, a front wall 13 and a roof 14. The roof and walls of the forehearth provide a confined space or chamber 14ª. An outlet opening 15 is provided at the forward end of the boot for the discharge of glass under the control of an implement 16 which may be the usual reciprocating plunger.

Extending downward into the glass in the extension 10 is a block 17 of refractory material separating the accumulating chamber 11 from the main tank. Said block is spaced from the floor 11ª to provide a throat or passageway 18 thru which the glass flows from the melting tank into the chamber 11. The block 17 is formed with a channel 19 for the circulation of water or other cooling fluid.

A block 20 extends downward thru an opening in the roof 14 of the forehearth and may extend into the glass, thereby separating the space above the glass in the chamber 11 from the air space in the forehearth. A stack 21 is located between the blocks 17 and 20 and is provided with a damper 22 which may be adjusted to control the escape of heat thru the flue. This permits the temperature of the glass in the accumulating chamber 11 to be controlled within certain limits. A block 23 is located between the bridge wall 17 and the front wall 7 of the melting tank and may be lowered to shut off the flow of glass from the melting tank.

Above the roof 14 of the forehearth is a horizontally disposed block 24 which, as shown in Fig. 2, is in cross section the shape of an inverted U and forms with said roof a channel 25 which extends lengthwise of the forehearth. The forward end of said channel is closed and the rear end thereof opens into the flue of a stack 26 just in front of the block 20. A damper 27 is adjustable to regulate the passage of gases thru the flue. A series of ports or openings 28 which extend thru the roof 14 are arranged at intervals lengthwise of the roof and open into the channel 25. These ports are individually controlled by slide plates or valves 29 which extend thru openings 31 in the side wall of the block 24 and are provided with handes 30, permitting operation of the slides to close the ports 28 or open them to any desired extent.

A temperature regulating medium is supplied within the chamber 14ª for regulating the temperature of the glass flowing thru said chamber. As shown, burners 32 are provided for this purpose. These burners comprise nozzles extending thru the side walls of the forehearth and projecting in a forward direction so that the gases of combustion will be directed toward the front end of the forehearth. If desired, these nozzles could be used as a means for directing a cooling fluid into the chamber 14ª.

The glass in its passage from the melting tank into the chamber 11 is cooled to a certain extent during its passage thru the throat 18. The extent of this cooling can be regulated within certain limits by adjusting the bridge wall 17 up or down. By adjusting it to a higher position, less cooling of the glass takes place, and vice versa. The glass while in the accumulating chamber 11 is cooled to a certain extent on account of the heat being conveyed upwardly thru the stack 21. The amount of heat thus dissipated can be regulated by adjustment of the cover 22. As the glass passes forward thru the forehearth, the temperature can be maintained substantially constant, or it can be either raised or lowered, depending on the activity of the burners 32 and the adjustment of the valve plates controlling the ports 28. If it is desired to direct the heat to the forward end of the forehearth, the foremost port 28 is left open as indicated in Fig. 1 and the other ports closed. The gases of combustion will then pass from the burners over the surface of the glass to and thru the open port and thence rearwardly thru the channel 25 and up the flue. The rate of flow of the hot gases can be regulated both by adjusting the valve plate 29 to throttle the flow at the port, and also by adjusting the stack damper 27. If it is found that the glass at the forward end of the boot is too hot, this condition can be corrected by closing the forward port and opening one or more of the other three ports 28.

Modifications may be resorted to within the spirit and scope of my invention.

What I claim is:

1. In a glass furnace, the combination of a main tank, a forehearth extension provided with an outlet opening for the glass at the forward end thereof, the walls of the forehearth being formed with ports or openings at intervals lengthwise thereof, valves individual to said ports, means providing a channel into which said ports open, and a stack communicating with said channel.

2. In a glass furnace, the combination of a main tank, a forehearth extension provided with an outlet opening for the glass at the forward end thereof, the walls of the forehearth being formed with ports or openings at intervals lengthwise thereof, valves individual to said ports, means providing a channel into which said ports open, a stack communicating with said channel, and a damper for adjusting the flue in said stack.

3. The combination of a main tank, a forehearth extending outwardly therefrom, said forehearth comprising a roof formed with ports or outlet openings positioned at intervals lengthwise thereof, means for individually adjusting the effective size of said openings, a housing positioned over said openings and providing a channel thru which gases passing thru said openings are directed, and a stack communicating with said channel.

4. In a glass furnace, the combination of a main tank, a forehearth extending outwardly therefrom and having a glass delivery outlet adjacent its outer end, said forehearth comprising a roof formed with outlet openings positioned at intervals lengthwise thereof, means for directing heated gases into the forehearth at a point inwardly from the outlet openings and causing forward movement of the heated gases in said forehearth, and slide plates individual to the outlet openings for opening and closing the openings whereby the extent of forward travel of heated gases in the forehearth may be regulated.

5. In a glass furnace, the combination of a main tank, a forehearth extension provided with an outlet opening for the glass at the forward end thereof, the walls of the forehearth being formed with ports or openings at intervals lengthwise thereof, valves individual to said ports, and means providing a channel into which said ports open, said channel being provided with an outlet for the escape of gases admitted to the channel through said ports.

6. In a glass furnace, the combination of a main tank, a forehearth extension provided with an outlet opening for the glass at the forward end thereof, the walls of the forehearth being formed with ports or openings at intervals lengthwise thereof, valves individual to said ports, means providing a channel into which said ports open, said channel being provided with an outlet, and a valve controlling the outlet.

Signed at Toledo, Ohio, this 15 day of April, 1929.

LEONARD D. SOUBIER.